(12) United States Patent
Miura et al.

(10) Patent No.: US 11,058,982 B2
(45) Date of Patent: Jul. 13, 2021

(54) ELECTRIC MACHINE TOOL

(71) Applicant: YAMABIKO CORPORATION, Tokyo (JP)

(72) Inventors: Hirokazu Miura, Tokyo (JP); Noriyuki Takeuchi, Tokyo (JP); Koji Hirakawa, Tokyo (JP); Atsushi Nishimura, Tokyo (JP); Kunihiko Haramoto, Tokyo (JP); Tomohiro Nakashima, Tokyo (JP)

(73) Assignee: YAMABIKO CORPORATION, Tokyo (JP)

( * ) Notice: Subject to any disclaimer, the term of this patent is extended or adjusted under 35 U.S.C. 154(b) by 310 days.

(21) Appl. No.: 16/285,421

(22) Filed: Feb. 26, 2019

(65) Prior Publication Data

US 2019/0262753 A1    Aug. 29, 2019

(30) Foreign Application Priority Data

Feb. 26, 2018  (JP) .............................. JP2018-032342

(51) Int. Cl.
*B01D 46/00* (2006.01)
*B01D 46/24* (2006.01)
(Continued)

(52) U.S. Cl.
CPC ...... *B01D 46/0005* (2013.01); *B01D 46/2411* (2013.01); *B23Q 11/14* (2013.01);
(Continued)

(58) Field of Classification Search
CPC . B01D 46/0005; B01D 46/2411; B27B 17/00; B27B 17/08; B25F 5/008; B23Q 11/14; F02B 63/02; F02M 35/024
(Continued)

(56) References Cited

U.S. PATENT DOCUMENTS

| 9,138,884 B2 * | 9/2015 | Heinzelmann | ......... B23Q 11/14 |
| 2006/0222930 A1 * | 10/2006 | Aradachi | ............... B25F 5/008 |
| | | | 429/96 |

(Continued)

FOREIGN PATENT DOCUMENTS

JP    2010058186 A    3/2010

OTHER PUBLICATIONS

European Patent Office; Extended European Search Report for Application No. 19158990.2-1019; European Patent Office Communication; dated Sep. 17, 2019. 7 pp.

*Primary Examiner* — Minh Chau T Pham
(74) *Attorney, Agent, or Firm* — Grumbles Law PLLC; Brittany Nanzig (57) ABSTRACT

A an electric machine tool having a body to which a work tool is attached, a motor, and a battery. The body has a motor receiving chamber, a battery receiving chamber opening through an outer surface of the body, and a communication path through which the battery receiving chamber is in communication with the motor receiving chamber. A first air inlet opening is formed between the inner edge of an opening of the battery receiving chamber and the outer periphery of the battery disposed in the battery receiving chamber. Further, an inflow port of the communication path opens to an inner side surface of the battery receiving chamber and an air filter is fitted over the inflow port.

8 Claims, 6 Drawing Sheets

(51) Int. Cl.
  *F02B 63/02*    (2006.01)
  *B27B 17/00*    (2006.01)
  *B25F 5/00*     (2006.01)
  *F02M 35/024*   (2006.01)
  *B23Q 11/14*    (2006.01)

(52) U.S. Cl.
  CPC .............. *B25F 5/008* (2013.01); *B27B 17/00* (2013.01); *F02B 63/02* (2013.01); *F02M 35/024* (2013.01)

(58) Field of Classification Search
  USPC ......... 55/385.1, 490; 30/381–387; 123/41.56
  See application file for complete search history.

(56) References Cited

U.S. PATENT DOCUMENTS

| | | |
|---|---|---|
| 2011/0180286 A1 | 7/2011 | Oomori et al. |
| 2011/0303718 A1* | 12/2011 | Spasov .................... B25C 1/06 227/2 |
| 2012/0066916 A1* | 3/2012 | Heinzelmann ......... B23Q 11/14 30/381 |
| 2014/0139055 A1 | 5/2014 | Oomori et al. |

* cited by examiner

ELECTRIC MACHINE TOOL

CROSS REFERENCE TO RELATED APPLICATION

This application claims priority of Japan patent application No. 2018-032342, filed on Feb. 26, 2018, the entire content of which is incorporated herein by reference.

FIELD OF THE INVENTION

The invention relates to an electric machine tool.

BACKGROUND OF THE INVENTION

A body of an electric machine tool such as a chain saw and a brush cutter has a motor receiving chamber, in which a motor has been disposed, and a battery receiving chamber, in which a battery is to be disposed. According to such electrical machine tool, a battery is disposed in a battery receiving chamber and the battery supplies electrical power to a motor to drive a work tool such as a saw chain and a rotating blade.

According to the conventional electric chain saw, a battery receiving chamber opens through an upper face of a body and may be configured to cool a motor in a motor receiving chamber and a control board by making air flow from a battery receiving chamber into the motor receiving chamber (e.g., U.S. Pat. No. 9,138,884).

DESCRIPTION OF THE RELATED ART

U.S. Pat. No. 9,138,884 discloses an electric machine tool of the type described above.

SUMMARY OF THE INVENTION

According to the conventional chain saw described above, chips and dust particles occurring during cutting are likely to enter into the motor receiving chamber from the battery receiving chamber. The accumulation of the dust particles in the motor receiving chamber leads to reduction in the cooling efficiency of the motor as well as of the control board, and reduction in the driving efficiency of the motor. Thus, according to the conventional chain saw, the interior of a body must be cleaned frequently, which makes the maintenance of the conventional chain saw difficult.

It is an object of the invention to provide an electric machine tool that is capable of preventing dust particles from coming into a motor receiving chamber and that reduces the frequency of the maintenance of the electric machine tool.

The electric machine tool of the invention includes: a body, to which a work tool is attached; a motor for driving the work tool; a battery for supplying electrical power to the motor; and, the body having a motor receiving chamber, in which the motor is disposed, an air discharging means to discharge the air in the motor receiving chamber, a battery receiving chamber opening through an outer surface of the body, and a communication path, through which the battery receiving chamber is in communication with the motor receiving chamber. A first air inlet opening is formed between the inner edge of an opening of the battery receiving chamber and the outer periphery of the battery disposed in the battery receiving chamber. An inflow port of the communication path opens to an inner side surface of the battery receiving chamber. An air filter is fitted over the inflow port.

According to the electric machine tool of the invention, when air flows through the air filter into the communication path, the dust particles in the air are filtered off by the air filter. In this way, dust particles are unlikely to enter into the motor receiving chamber. Thus, according to the disclosed electric machine tool, dust particles are unlikely to remain in the motor receiving chamber. This can extend time between the cleanings of the interior of a body and can reduce the frequency of the maintenance of the electric machine tool. The air filter is disposed on an inner side surface of the battery receiving chamber according to the electric machine tool of the invention. Thus, the attachment/detachment of and the cleaning of the air filter can be simply conducted from the outside of the body by removing the battery from the battery receiving chamber.

BRIEF DESCRIPTION OF THE DRAWINGS

The invention will now be described with reference to the drawings wherein.

DESCRIPTION OF THE PREFERRED EMBODIMENT OF THE INVENTION

Embodiments of the invention will be explained in detail appropriately referring to the drawings. The embodiments are explained with an example configuration of a chain saw cutting woods, boards, etc, to which the present invention can be applied.

Figure 1:
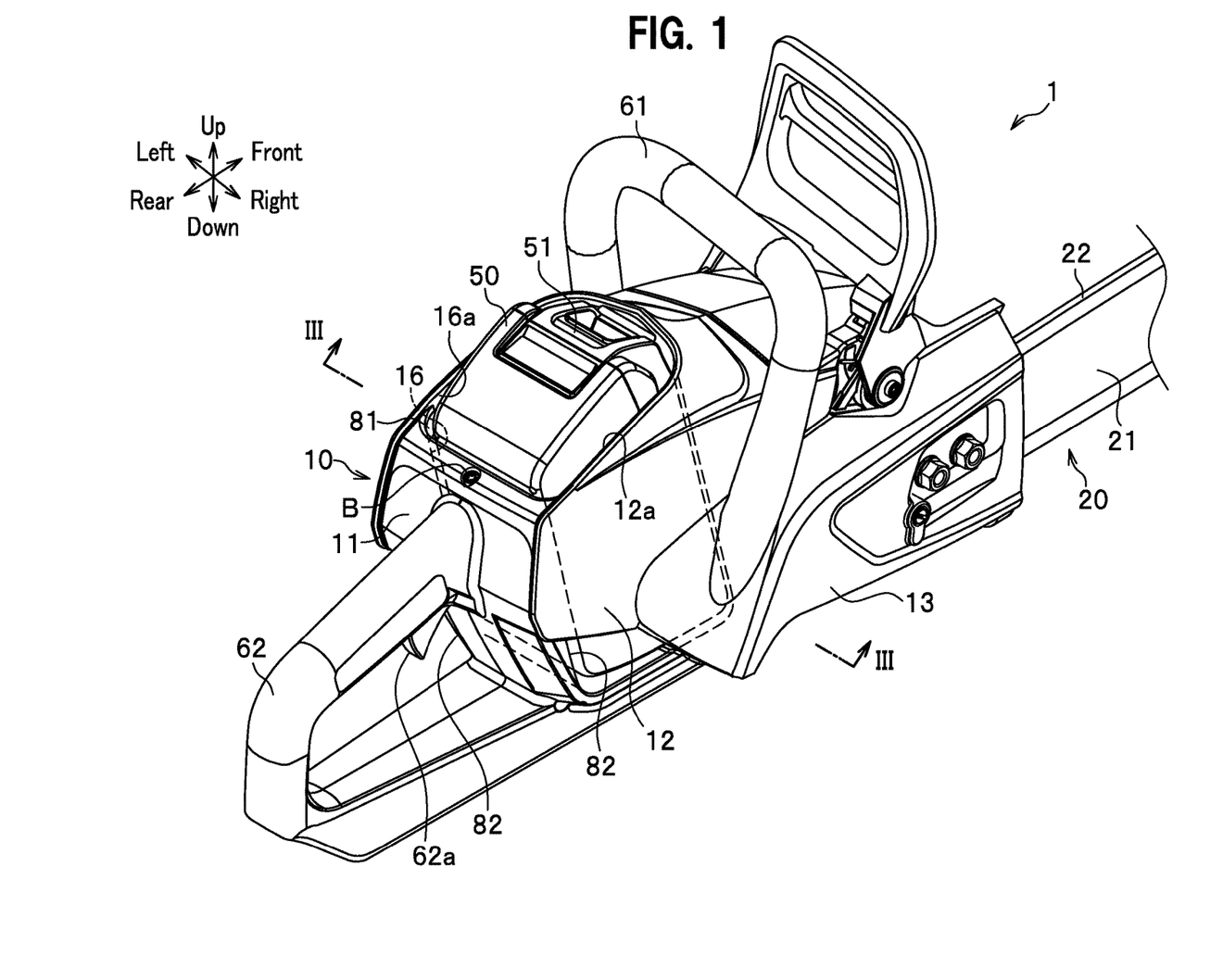
FIG. 1 is a perspective view of the electric machine tool of one embodiment of the invention when viewed from an upper rear right direction.

As FIG. 1 shows, a chain saw 1 can have a body 10 and a cutter 20 attached to the body 10. As FIG. 4 shows, the chain saw 1 can have a motor 30 for driving the cutter 20, a control board 40 for controlling operation of the motor 30, and a battery 50 for supplying electrical power to the motor 30.

As FIG. 1 shows, the body 10 can have a body housing 11 made of a resin and an upper cover 12 made of a resin covering a top portion of the body housing 11. As FIG. 4 shows, a motor receiving chamber 15 and a battery receiving chamber 16 may be formed in the body housing 11.

Figure 4:
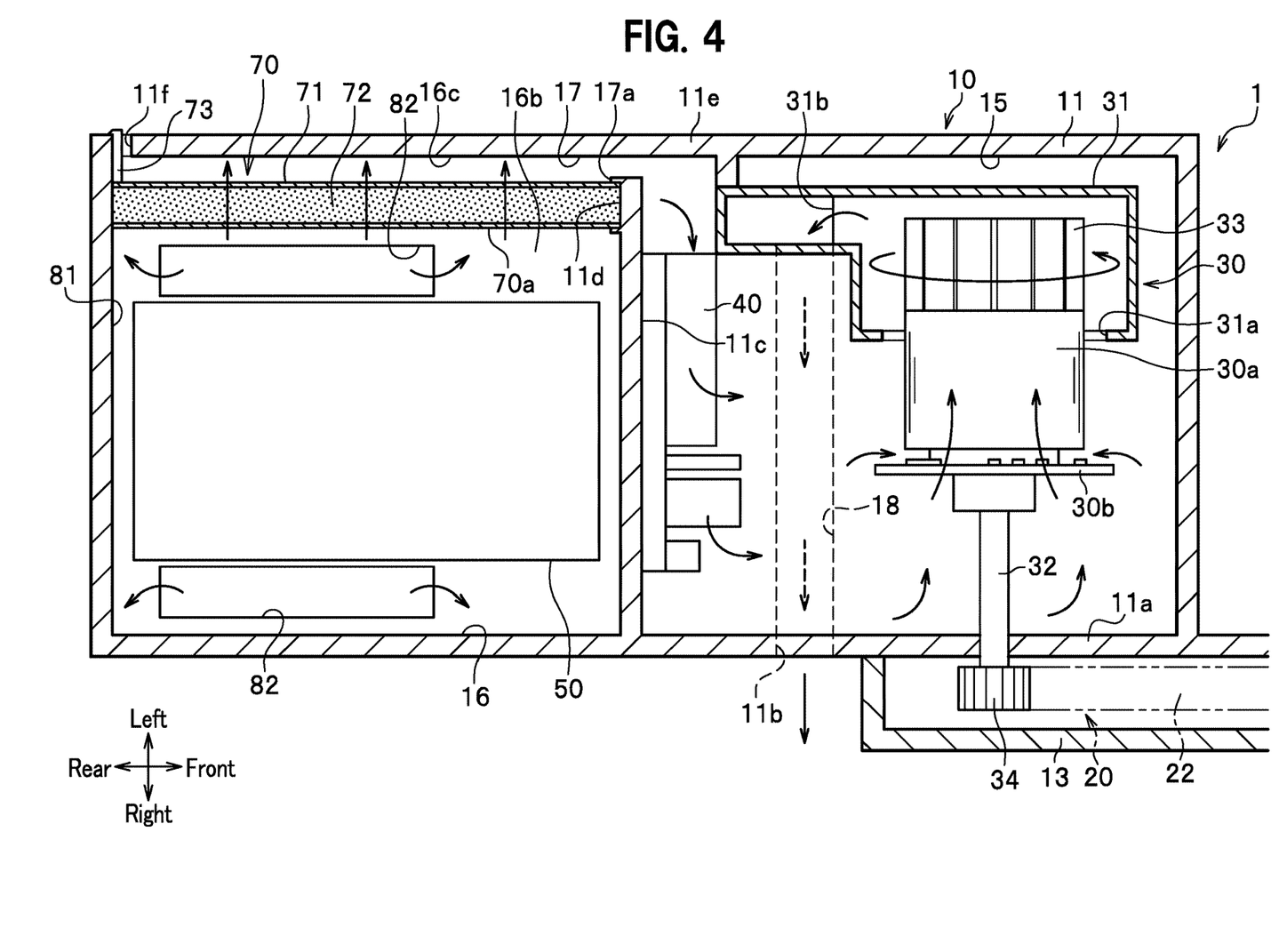
FIG. 4 is a schematic view for the cooling structure of the electric machine tool of the embodiment of the invention.

The motor receiving chamber 15 may be formed in a front area of the body housing 11, as FIG. 4 shows. The body housing 11 can have an interior housing space in which the motor receiving chamber 15 is formed. Driving mechanism devices, such as the motor 30, the control board 40, and a blower fan 33, may be disposed in the motor receiving chamber 15.

The motor 30 may be any type of an electric motor that has been known to have a hollow motor housing 31, into which a cylindrical yoke 30a is inserted, an output shaft 32 engaged with the yoke 30a, and a sensor board 30b for detecting the rotation of the yoke 30a.

An insertion hole 31a, through which the yoke 30a is inserted, may be formed through the right side surface of the motor housing 31, as FIG. 4 shows. A gap can be formed between the inner edge of the insertion hole 31a and the outer periphery of the yoke 30a.

An outflow port 31b can open through a bottom portion of the motor housing 31. A cylindrical air flow path 18, through which the outflow port 31b may be in communication with an air outlet opening 11b, can be formed at the bottom of the body housing 11. One end of the air flow path 18 can communicate with the outflow port 31b and the other end can communicate with the air outlet opening 11b, which may open through the right side surface of the body housing 11, as FIG. 4 shows.

A stator (not shown in the drawings) may be disposed in the yoke 30a. When a coil of the stator is energized, the yoke can rotate around the axis of the output shaft. A base end portion of the output shaft 32 may engage with the yoke 30a, and a leading end portion of the output shaft 32 can project outwardly through a right side wall 11a of the body housing 11, as FIG. 4 shows.

The sensor board 30b, which can engage with the stator, may be fixed relative to the motor 30. The sensor board 30b can have a circular shape with a center hole. The yoke 30a may be concentrically inserted through the center hole of the sensor board 30b.

The blower fan 33 may be disposed in the motor housing 31. The blower fan 33 can be secured to the yoke 30a. Thus, the blower fan 33 can rotate in conjunction with the rotation of the yoke 30a. The blower fan 33, the outflow port 31b, the air flow path 18, and the air outlet opening 11b may constitute air discharging means to discharge the air in the motor receiving chamber 15 to the outside of the body housing 11. The blower fan 33 can blow the air in the motor housing 31 when rotating and then push the air flow via the outflow port 31b through the air flow path 18 via the air outlet opening 11b to the outside of the body housing 11. Meanwhile, the air in the motor receiving chamber 15 can flow into the motor housing 31 through the insertion hole 31a. In this way, the air in the motor receiving chamber 15 can be discharged through the motor housing 31 to the outside of the body housing 11.

A drive gear 34 may engage with the leading end portion of the output shaft 32. The drive gear 34 can be disposed adjacent to the right side wall 11a of the body housing 11, as FIG. 4 shows.

The control board 40 may be an electrical circuit board attached onto a heat dissipation member made of metal. The control board 40 can be electrically connected to the motor 30. The control board 40 may be disposed in a rear area of the motor receiving chamber 15, as FIG. 4 shows.

Figure 2:
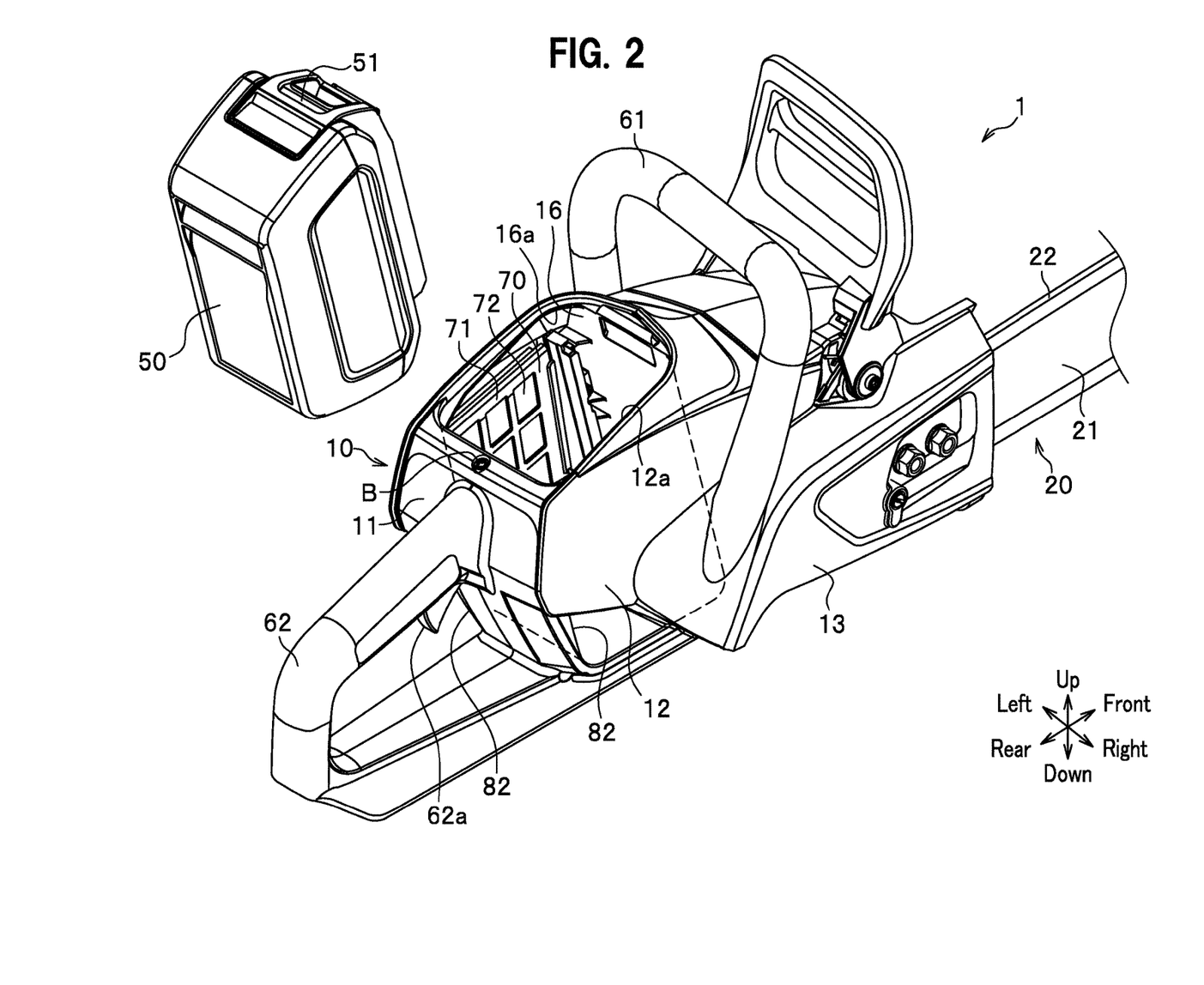
FIG. 2 is a perspective view of the electric machine tool of the embodiment of the invention when viewed from an upper rear right direction with a battery removed from a body.

The battery receiving chamber 16 can be formed in a rear area of the body housing 11, as FIG. 4 shows. As FIG. 2 shows, the battery receiving chamber 16 can be a substantially rectangular receptacle and can open through an upper face of the body housing 11.

Figure 3:
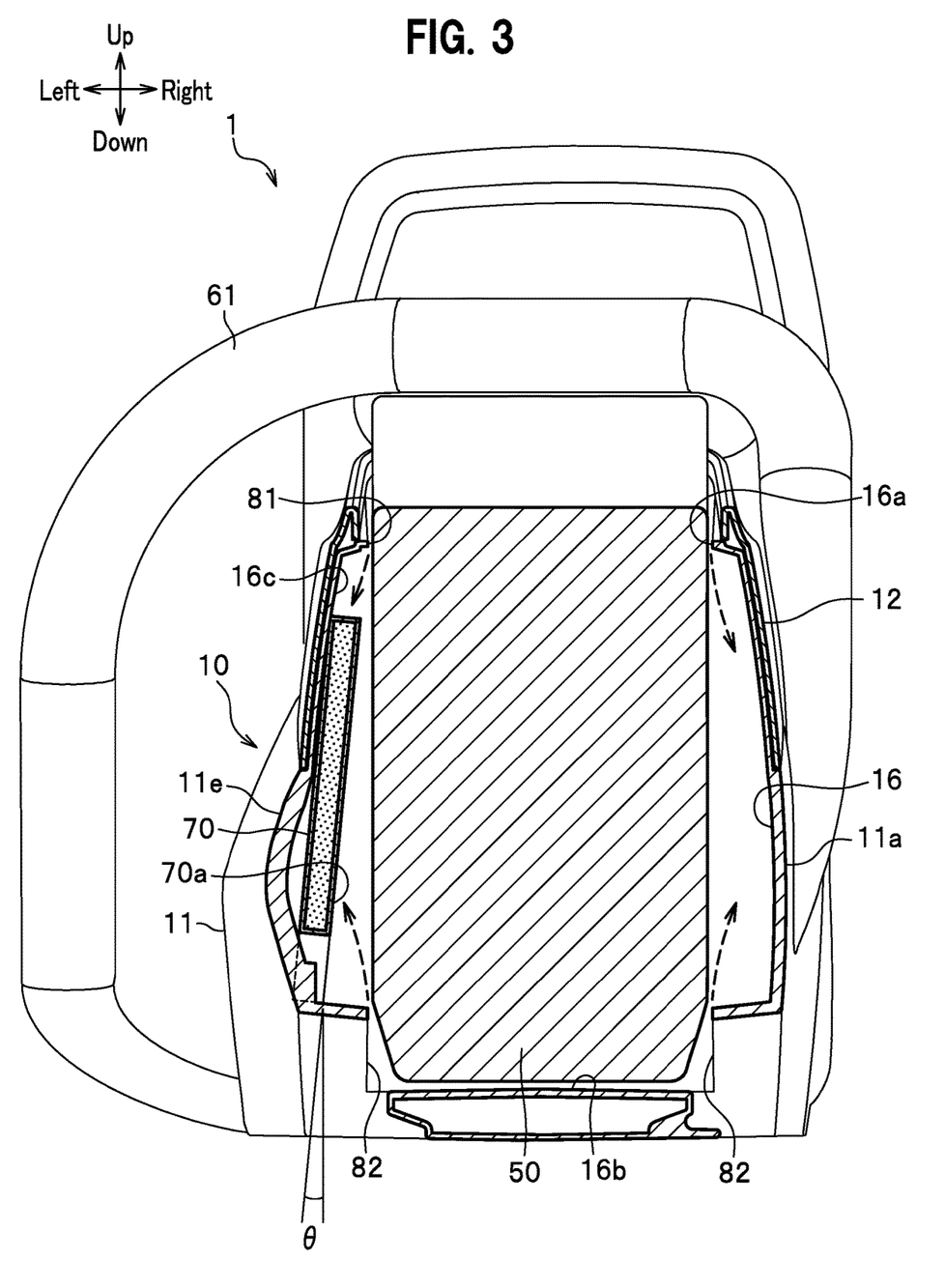
FIG. 3 is a sectional view when the electric machine tool illustrated in FIG. 1 is cut along the III-III plane.

The battery receiving chamber 16 can receive the battery 50 (as referred to FIG. 3). The battery 50 may be any type of a known battery and can comprise a rectangular housing and a secondary battery (e.g., a lithium ion battery) disposed in the rectangular housing.

As FIG. 3 shows, a gap may be formed between the inner edge of an opening 16a of the battery receiving chamber 16 and the outer periphery of an upper portion of the battery 50 disposed in the battery receiving chamber 16. Thus, this gap can function as a first air inlet opening 81. According to one embodiment, as illustrated in FIG. 1, the first air inlet opening 81 may have a circular shape and extend along the outer periphery of the upper portion of the battery 50.

A connection terminal (not shown in the drawings), which may be electrically connected to the control board 40 shown in FIG. 4, is provided at the bottom of the motor receiving chamber 16. A connection terminal of the battery 50 can be connected to the connection terminal at the bottom of the battery receiving chamber 16, whereby the battery 50 supplies electrical power to the control board 40 and the motor 30.

An ejecting mechanism (not shown in the drawings) may be provided at the bottom of the battery receiving chamber 16 to eject the battery 50 from the battery receiving chamber 16. With the battery 50 held in the battery receiving chamber 16 as shown in FIG. 1, the ejecting mechanism can be actuated to push the battery 50 upward from the battery receiving chamber 16 by operating a lever 51 provided at the top of the battery 50.

As FIG. 3 shows, second right and left second air inlet openings 82, 82 may be formed through right and left bottom portions of the battery receiving chamber 16, and they may open through right and left lower portions in a rear area of the body housing 11. According to this embodiment, the total opening area of both of the second air inlet openings 82, 82 is configured to be larger than that of the first air inlet opening 81.

Right and left bottom portions of the battery 50, which can be disposed in the battery receiving chamber 50, may be exposed to the outside through both of the second air inlet openings 82, 82 (as referred to FIG. 1).

As FIG. 1 shows, a top portion of the body housing 11 is covered by an upper cover 12. The upper cover 12 can be fixed to the body housing 11 by one bolt B (as referred to FIG. 5). The upper cover 12 may have an opening 12a formed to be in communication with the opening 16a of the battery receiving chamber 16.

The cutter 20 may be attached to the right side of the body housing 11 as FIG. 4 shows. The cutter 20, which can be configured as a work tool for cutting, can have a guide bar 21 and a saw chain 22. The guide bar 21 may be a plate-like member extending longitudinally, and a rear end portion of the guide bar 21 may be attached to the right side of the body housing 11. The saw chain 22 can be wound along the periphery of the guide bar 21. As FIG. 4 shows, a rear end portion of the saw chain 22 may engage with the drive gear 34.

The saw chain 22 can be driven along the outer periphery of the guide bar 21 when the motor 30 is driven to rotate the drive gear 34, as illustrated in FIGS. 1 and 4. A side cover 13 can be attached to an outer surface of the right side wall 11a of the body housing 11 to cover the drive gear 34 and a rear end portion of the cutter 20.

As FIG. 1 shows, a front handle 61 as well as a rear handle 62 can be attached to the body housing 11. The front handle 61, which can have a gripping portion, may extend around the body housing 11 and be formed as a bent, cylindrical member. The rear handle 62 can engage with a rear portion of the body housing 11, as FIG. 1 shows. A trigger lever 62a can be disposed on the rear handle 62 and may be capable of increasing/decreasing the speed of the rotation of the saw chain 22 when gripping the rear handle 62.

An operator may typically grip the front handle 61 by one hand and the rear handle by the other hand when cutting an object such as wood, lumber and boards. The object can then be cut by operating the trigger lever 62a disposed on the rear handle 62, which can rotate the saw chain 22.

Because the cutter 20 may be attached to the right side of the body 10, according to the chain saw 1 of this embodiment, an operator may be positioned at the left side of the body 10 when using the chain saw 1.

The cooling structure of the chain saw 1 of this embodiment is explained below. As FIG. 4 shows, a communication path 17, through which the battery receiving chamber 16 is in communication with the motor receiving chamber 15, may be formed in the body housing 11. Air can be drawn into the motor receiving chamber 15 from the battery receiving chamber 16 through the communication path 17.

As FIG. 4 shows, the communication path 17 can be formed in a left area of the body housing 11, and can extend longitudinally relative to the left edge of a partition wall 11c between the motor receiving chamber 15 and the battery receiving chamber 16. An inflow port 17a of the communication path 17 can open to a left side surface 16c of the battery receiving chamber 16, as FIG. 4 shows.

An air filter 70 may be fitted over the inflow port 17a of the communication path 17. The air filter 70 can comprise a tabular frame body 71 and a nonwoven fabric 72 held by the tabular frame body 71, as illustrated in FIG. 2. The inflow port 17a can be closed by the air filter 70.

Figure 5:
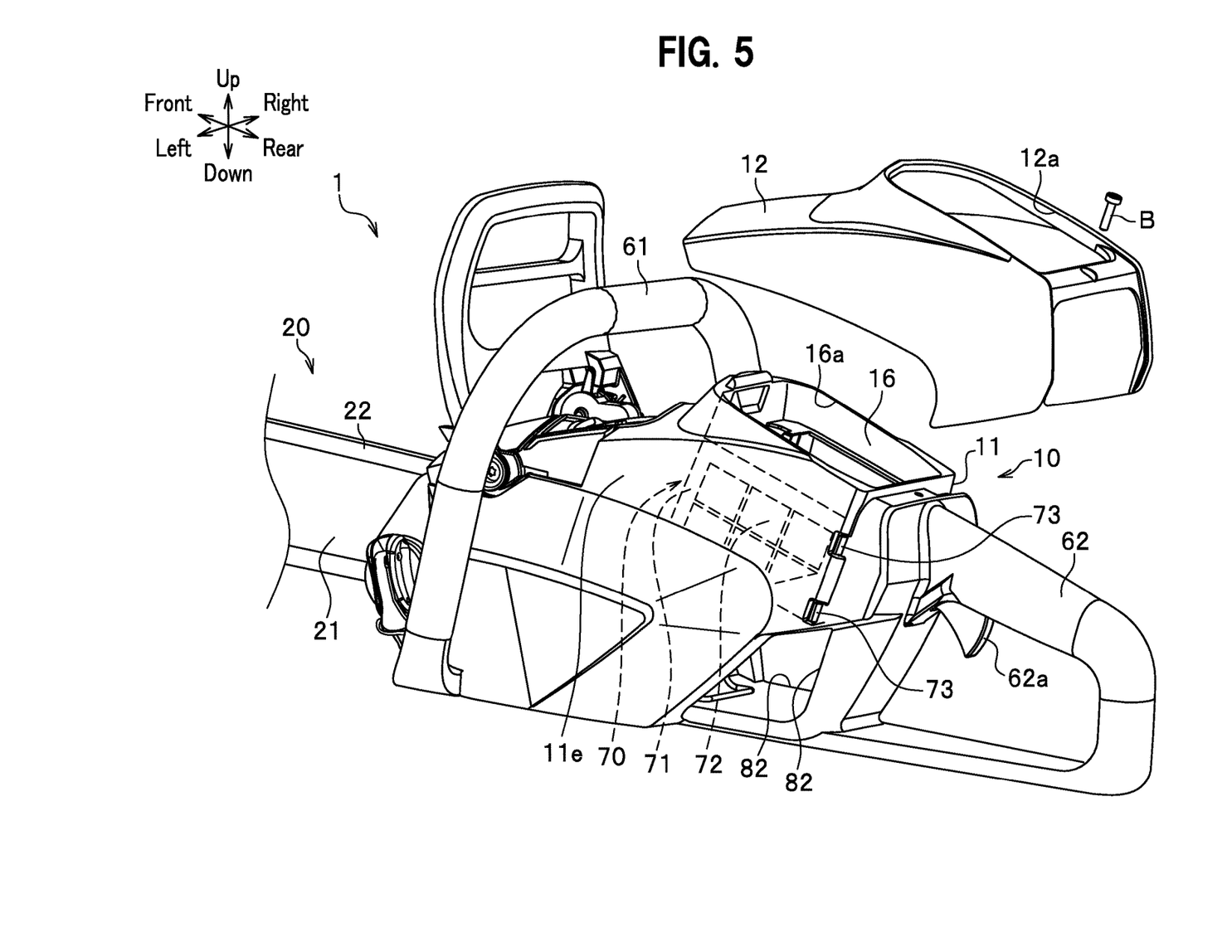
FIG. 5 is a perspective view of the electric machine tool of the embodiment of the invention when viewed from an upper rear left direction with an upper cover removed.

A front edge portion of the frame body 71 of the air filter 70 may be attached to an attachment groove 11d formed on an end portion of the partition wall 11c, as shown in FIG. 4. A rear edge portion of the frame body 71 can have a hook 73 projecting outwardly to the left, as FIG. 4 shows. The hook 73 may be inserted through an attachment hole 11f formed through a left wall 11e of the body housing 11. The leading end portion of the hook 73 can engage with an outer surface of the left wall 11e, as FIG. 4 shows. As illustrated in FIG. 5, the air filter 70 can, according to this embodiment, have upper and lower hooks 73, 73.

As FIG. 3 shows, a surface 70a of the air filter 70 can extend in the direction of a predetermined angle θ relative to the vertical direction. The surface 70a of the air filter 70 can come inward as the surface 70a of the air filter 70 extends upward. The surface 70a of the air filter 70 can thus extend downwardly obliquely. According to one embodiment, the predetermined angle θ of the surface 70a of the air filter 70 relative to the vertical direction may be set to 5 degrees.

As FIG. 3 shows, the left second air inlet opening 82 may be formed below the air filter 70. Thus, the air inlet opening 82 may be formed below the surface 70a of the air filter 70.

As FIG. 4 shows, according to the chain saw 1 of one embodiment, the air in the motor receiving chamber 15 can be discharged through the motor housing 31 to the outside of the body housing 11 when the motor 30 is driven to rotate the blower fan 33. The air in the motor receiving chamber 15 can be discharged by the air discharging means (the blower fan 33, the outflow port 31b, the air flow path 18, and the air outlet opening 11b), whereby the air can flow into the motor receiving chamber 15 through the communication path 17 from the battery receiving chamber 16.

As FIG. 3 shows, air can flow into the battery receiving chamber 16 through the first air inlet opening 81 and the second air inlet openings 82, 82 from the outside of the chain saw 1, and then flow into the communication path 17. As FIG. 4 shows, when air flows into the communication path 17 through the air filter 70, the dust particles in the air can be filtered off by the air filter 70. The control board 40 and the sensor board 30b can be cooled by the air that flows into the motor receiving chamber 15 from the communication path 17. The interior of the motor 30 can then be cooled by the air that flows into the motor housing 31 from the motor receiving chamber 15, which can improve the cooling efficiency of the motor 30.

The air in the motor receiving chamber 15 may be discharged from a left area in the body housing 11 through the air flow path 18 to the outside (the right side) adjacent to the work tool 20, as FIG. 4 shows. The air in the motor receiving chamber 15 can be simply discharged because an operator is at the left side of the body housing 11, according to the chain saw 1 of this embodiment. The air in the motor receiving chamber 15 can be discharged through a right side surface of the body housing 11, which also enables an operator at the left side of the body housing 11 to keep away from chips and dust particles occurring when cutting.

When the air filter 70 is to be removed from the body housing 11, the bolt B can be screwed off from the body housing 11 after removing the battery 50 from the battery receiving chamber 16, as FIG. 5 shows. Next, when the upper cover 12 is removed from the body housing 11, leading end portions of the two hooks 73, 73 may be exposed adjacent to an outer surface of the left wall 11e of the body housing 11.

Figure 6:
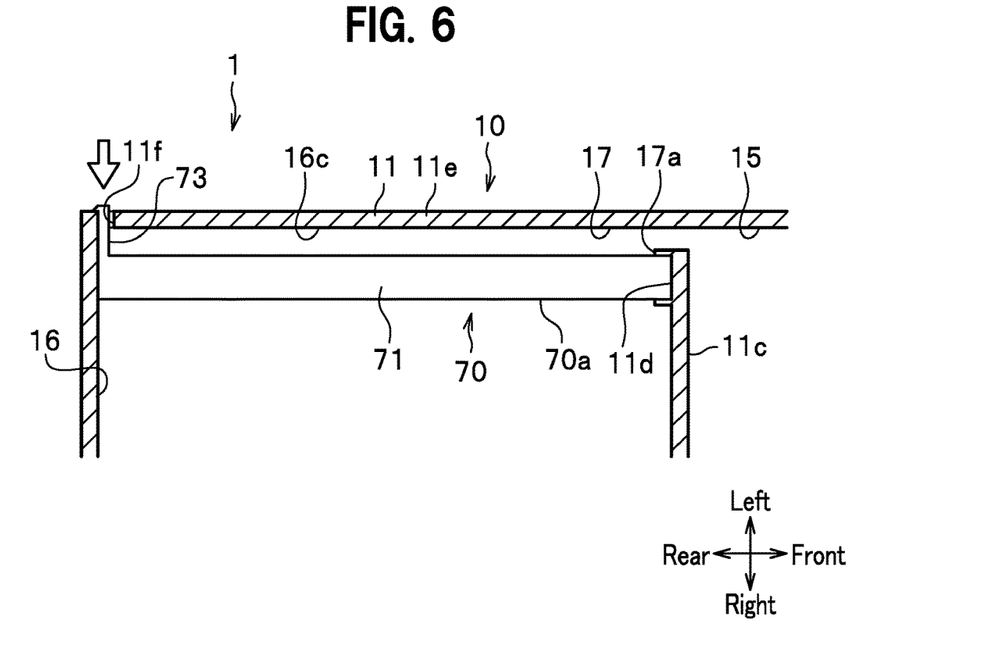
FIG. 6 is a sectional view of the electric machine tool of the embodiment of the invention during a detachment step of an air filter from a body housing.
Figure 7:
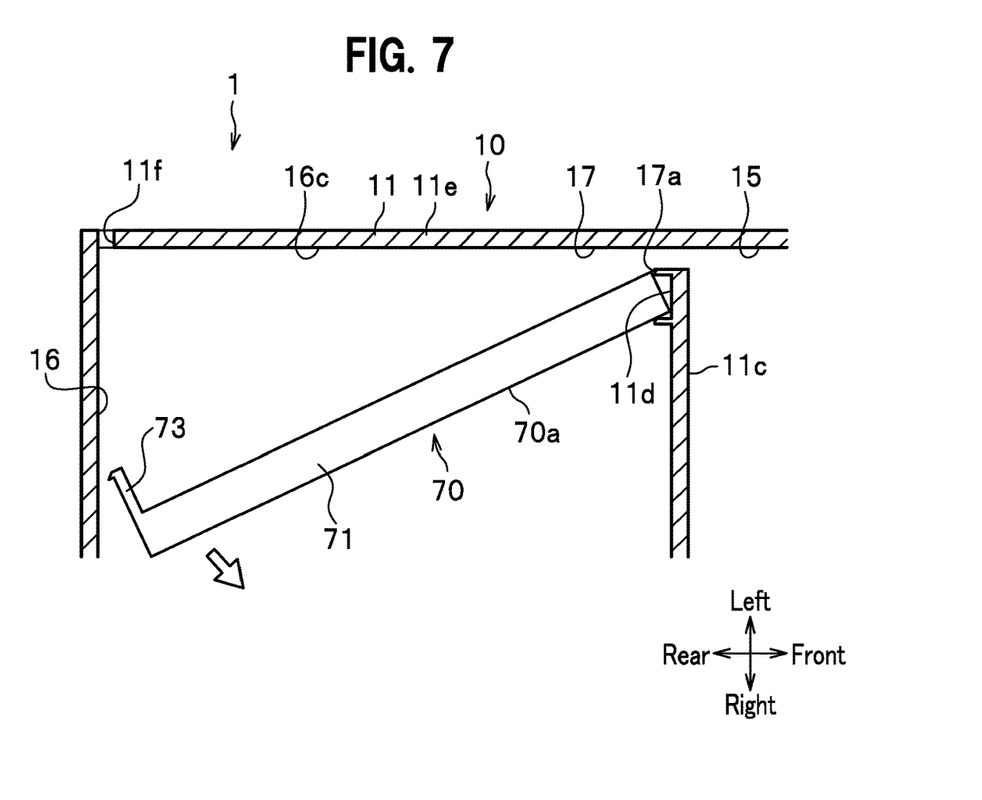
FIG. 7 is a sectional view of the electric machine tool of the embodiment of the invention during a detachment step subsequently to FIG. 6.

Subsequently, as FIG. 6 shows, the leading end portions of the hooks 73, 73 can be pushed through the attachment hole 11f. In this way, as FIG. 7 shows, the hooks 73, 73 can be detached from the left wall 11e of the body housing 11. Further, when a rear edge portion of the air filter 70 is moved inward in the battery receiving chamber 16, the air filter 70 can then be tilted relative to the left wall 11e, and a front edge portion of the air filter 70 can be detached from the attachment groove 11d. In this way, the air filter 70, which has been detached from the attachment groove 11d, can be removed out of the battery receiving chamber 16 through the opening 16a, as FIG. 5 shows.

The chain saw 1 (an electric machine tool) described above can include the body 10 to which the cutter 20 (a work tool) is attached, the motor 30 for driving the cutter 20, and the battery 50 for supplying electrical power to the motor 30. In the body 10, the motor receiving chamber 15, in which the motor 30 is disposed, the battery receiving chamber 16 opening through an outer surface of the body 10, and the communication path 17, through which the battery receiving chamber 16 is in communication with the motor receiving chamber 15, may be formed. The first air inlet opening 81 can be formed between the inner edge of the opening 16a of the battery receiving chamber 16 and the outer periphery of the battery 50 disposed in the battery receiving chamber 16. The inflow port 17a of the communication path 17 can open to the left side surface 16c of the battery receiving chamber 16. The air filter 70 can be fitted over the inflow port 17a.

According to the chain saw 1 of this embodiment, when air flows into the communication path 17 through the air filter 70, the dust particles in the air can be filtered off by the air filter 70. Thus, according to the chain saw 1 of this embodiment, dust particles are unlikely to enter into the motor receiving chamber 15. As a result, according to the chain saw 1 of this embodiment, dust particles are unlikely to remain in the motor receiving chamber 15. This can extend time between the cleans of the interior of the body 10 and can reduce the frequency of the maintenance of the chain saw 1.

According to the chain saw 1 of this embodiment, the air filter 70 may be disposed on the left side surface 16c of the battery receiving chamber 16. Thus, the attachment/detachment and the cleaning of the air filter 70 can be simply conducted from the outside of the body 10 through the opening 16a of the battery receiving chamber 16 by removing the battery 50 from the battery receiving chamber 16.

According to the chain saw 1 of this embodiment, as FIG. 3 shows, the surface 70a of the air filter 70 may extend in the direction of the predetermined angle θ relative to the vertical direction. Thus, dust particles are unlikely to settle on the surface 70a of the air filter 70. If the dust particles settle on the surface 70a of the air filter 70, the dust particles can easily fall off by impact and vibration, which are similar to those that occur when the chain saw 1 is placed on the ground. Thus, the air filter 70 is unlikely to become dirty and this can extend time between the cleans of the air filter 70 and time between the replacements of the air filter 70.

The body 10 of the chain saw 1, according to this embodiment, can have the second air inlet openings 82, 82, which may be formed through the right and left bottom portions of the battery receiving chamber 16 and which may open through an outer surface of the body 10. Because of this configuration, air can flow into the battery receiving chamber 16 from the first air inlet opening 81 and the second air inlet openings 82, 82. This ensures that a sufficient amount of air flows into the battery receiving chamber 16 to cool the motor 30 and the control board 40, as FIG. 4 shows.

According to the chain saw 1 of this embodiment, as FIG. 3 shows, both of the second air inlet openings 82, 82 may be formed, and the total opening area of both of the second air inlet openings 82, 82 may be configured, to be larger than that of the first air inlet opening 81.

Because of this configuration, the amount of the air that flows into the battery receiving chamber 16 from both of the second air inlet openings 82, 82 is likely greater than that which flows into the battery receiving chamber 16 from the first air inlet opening 81. This can lead to a low flow speed of the air into the battery receiving chamber 16 from the first air inlet opening 81 so that the number of the dust particles that flow into the battery receiving chamber 16 through the first air inlet opening 81 can be reduced. Because both of the second air inlet openings 82, 82 are formed through the right and left bottom portions of the battery receiving chamber 16, dust particles are unlikely to enter into the battery receiving chamber 16 from under the body 10 through the second air inlet openings 82, 82. Thus, according to the chain saw 1 of this embodiment, as FIG. 4 shows, dust particles may be unlikely to enter into the battery receiving chamber 16 and a necessary, sufficient amount of air can flow into the battery receiving chamber 16 to cool the motor 30 and the control board 40.

According to the chain saw 1 of this embodiment, as FIG. 3 shows, the dust particles that enter into the battery receiving chamber 16 may be discharged to the outside through the second air inlet openings 82, 82 formed through the right and left bottom portions of the battery receiving chamber 16. As a result, dust particles are unlikely to remain in the battery receiving chamber 16. As FIG. 3 shows, the left second air inlet opening 82 can be formed below the air filter 70 and, therefore, the dust particles that fall off from the air filter 70 may also discharged to the outside through the left second air inlet opening 82.

According to the chain saw 1 of this embodiment, when the battery 50 is disposed in the battery receiving chamber 16, the right and left bottom portions of the battery 50 may be exposed through both of the second air inlet openings 82, 82 formed through the right and left bottom portions of the battery receiving chamber 16. Thus, even if the ejecting mechanism for the battery 50 does not work, the battery can be removed out of the battery receiving chamber 16 by inserting a hand into the battery receiving chamber 16 from the second air inlet opening 82 and then pushing a bottom portion of the battery 50 upward.

According to the chain saw 1 of this embodiment, as FIG. 4 shows, the cutter 20 (a work tool) may be attached to the one side (such as the right side) of the body 10. In this configuration, an operator is typically at the left side of the body 10. As a result, dust particles become unlikely to enter into the battery receiving chamber 16 through a left area of the first air inlet opening 81 and the left second air inlet opening 82. According to the chain saw 1 of this embodiment, the inflow port 17a of the communication path 17 is formed inside the left side surface 16c (i.e., the opposite side) of the battery receiving chamber 16 of the body 10. As a result, dust particles are unlikely to settle on the air filter 70 fitted over the inflow port 17a.

Although the embodiments of this invention have been described above, the invention is not limited to the embodiments and changes as well as modifications can be appropriately made hereto without departing from the spirit and scope of the present disclosure. According to the chain saw 1 of this embodiment, as FIG. 4 shows, the communication path 17 is formed and the air filter 70 is disposed in a left area of the body 10, which is, however, not limited. The communication path 17 may be formed and the air filter 70 may be disposed in a front, a rear, or a right area of the body 10.

According to the chain saw 1 of this embodiment, as FIG. 3 shows, the surface 70a of the air filter 70 is disposed so as to extend downwardly obliquely relative to the vertical direction. The shape and the attachment state of the air filter 70 is, however, not limited to this, and the surface 70a of the air filter 70 may, for example, extend in the horizontal direction.

According to the chain saw 1 of this embodiment, both of the second air inlet openings 82, 82 are formed through the right and left bottom portions of the battery receiving chamber 16, but the number and the shapes of the second air inlet openings 82, 82 are not limited to this. According to the chain saw 1 of this embodiment, as FIG. 1 shows, the first air inlet opening 81 has a circular shape and extends along the entire outer periphery of the upper portion of the battery 50. The first air inlet opening 81 may, however, extend along a part of the entire outer periphery of the upper portion of the battery 50.

According to this embodiment, the chain saw 1 to which this invention is applied has been described above, but an electric machine tool to which the invention can be applied is not limited. Thus, this invention can apply to other electric machine tool such as a brush cutter, a hedge trimmer, and a blower.

It is understood that the foregoing description is that of the preferred embodiments of the invention and that various changes and modifications may be made thereto without departing from the spirit and scope of the invention as defined in the appended claims.

What is claimed is:

1. An electric machine tool comprising:
   a body, which a work tool is attached to and which has a body housing;

a motor which drives the work tool and has a hollow motor housing and a yoke, the hollow motor housing having an insertion hole through which the yoke is inserted with a gap; and a battery for supplying electrical power to the motor;

wherein said body has a motor receiving chamber, in which the motor is disposed, a battery receiving chamber which houses the battery and has an opening through an outer surface of the body, and a communication path, through which the battery receiving chamber is in communication with the motor receiving chamber;

wherein said body further has a blower fan disposed in the hollow motor housing to rotate in conjunction with rotation of the yoke, an outflow port formed through a bottom portion of the hollow motor housing, an air flow path formed at a bottom of the body housing, and an air outlet opening formed through the body housing, wherein a first air inlet opening is formed between an inner edge of the opening of the battery receiving chamber and an outer periphery of the battery disposed in the battery receiving chamber;

wherein an inflow port of the communication path opens to an inner side surface of the battery receiving chamber; and wherein an air filter is fitted over the inflow port.

2. The electric machine tool of claim 1, wherein:
a surface of the air filter extends downwardly obliquely relative to the vertical direction.

3. The electric machine tool of claim 2, wherein:
a second air inlet opening which is formed through a bottom portion of the battery receiving chamber and opens through the outer surface of the body.

4. The electric machine tool of claim 3, wherein:
the second air inlet opening is disposed below the air filter.

5. The electric machine tool of claim 3, wherein:
the opening area of the second air inlet opening is larger than the opening area of the first air inlet opening.

6. The electric machine tool of claim 1, wherein:
the work tool is attached to one side of the body and the inflow port is formed in the battery receiving chamber inside the other side of the body.

7. The electric machine tool of claim 4, wherein:
the opening area of the second air inlet opening is larger than the opening area of the first air inlet opening.

8. The electric machine tool of claim 1, wherein:
the air filter is removable from the battery receiving chamber through the opening of the battery receiving chamber.

* * * * *